United States Patent Office 3,243,451
Patented Mar. 29, 1966

3,243,451
EXTRACTION OF PYRETHRUM
Julius Ward, Nairobi, Kenya, assignor to Mitchell Cotts Pyrethrum Limited, a company of Kenya
No Drawing. Filed Aug. 23, 1962, Ser. No. 218,842
Claims priority, application Great Britain, Sept. 27, 1961, 34,642/61
5 Claims. (Cl. 260—468)

This invention relates to an improved method for the production of pyrethrum extract.

It is an object of the present invention to provide an improved method for producing pyrethrum extract by the extraction of dried or undried pyrethrum flowers.

The employment of alcohols of low molecular weight for the extraction of pyrethrum flowers has previously been suggested but such solvents yield an extract containing a large amount of undesirable extraneous material. This extraneous material could be removed by distilling off the alcohol and extracting the residue with a different solvent, but such purification processes result in a substantial loss of pyrethrins. The present method makes it possible to overcome this disadvantage by subjecting the solution obtained by extracting the flowers with aqueous methanol to a liquid/liquid partition with a solvent such as isohexane or kerosene, without prior concentration of the aqueous methanol solution. The product obtained from this partition process contains the pyrethrins of the starting material in high yield, but very little of the waxes or natural colouring matter. The product is therefore suitable for use as an "aerosol grade" extract of pyrethrum with little or not further purification.

Previous processes for producing dewaxed and/or decolourised extract have involved removal of the primary solvent followed by one or more stages of re-extraction and solvent removal. By the present process, the need for these subsequent stages is reduced or avoided, and processing losses are consequently less. In one form of the invention, the need for solvent removal under vacuum is avoided altogether.

In order to effect the liquid/liquid separation, it is necessary to have water present in the methanol to reduce the mutual solubility of the methanol and hydrocarbon solvent layers, and to reduce the solubility of the pyrethrins in the methanol. In the preferred form of the invention, the water is added to the methanol before extraction of the flowers, as the amount of colouring matter extracted is thereby reduced. We have found that methanol extracts the pyrethrins from ground flowers in high yield more rapidly than other solvents, and this high rate of extraction is maintained when methanol containing up to 40% by weight of water is used as the solvent.

According to the present invention there is provided a process for the production of pyrethrum extract from dried or undried pyrethrum flowers which process comprises extracting the flowers with aqueous methanol containing between 5% and 40% by weight of water followed by liquid/liquid extraction of the solution of pyrethrins so obtained with a hydrocarbon solvent.

Aqueous methanol is employed as the solvent preferably containing between 20% and 40% by weight of water.

Thus for example a substantially decolourised and wax-free extract containing pyrethrins may be obtained by extracting dried or undried pyrethrum flowers with or without prior grinding or crushing, with a solvent consisting of methanol containing between 5% and 40% by weight of water, then transferring the pyrethrins from the solution so obtained into a hydrocarbon solvent by a process of liquid/liquid extraction and recovering the extract containing the pyrethrins by distilling off the hydrocarbon solvent. The hydrocarbon solvent may be isohexane or odourless distillate. If odourless distillate is employed (i.e. the highest boiling fraction of kerosene distilled to remove aromatics) the solvent need not be distilled off, but the resulting extract constitutes the desired purified product.

When fresh undried pyrethrum flowers are employed, the water from the flowers contributes to the amount of the water required to obtain the appropriate solvent mixture of methanol and water.

The present process eliminates the decolourising dewaxing stage which is necessary when petrol is employed as the primary solvent.

Following is a description by way of example of methods of carrying the invention into effect. Examples 1 and 2 describe the first stage of extraction of dried flowers with aqueous methanol, while Examples 3 and 4 describe the liquid/liquid extraction with isohexane and kerosene respectively. Example 5 shows the application of the process to undried flowers.

EXAMPLE 1

*Extration of dried flowers with aqueous methanol*

100 g. of dried flowers, ground in a cutting mill fitted with a 3 mm. screen, were packed into a glass tube and extracted with methanol containing 30% by weight of water, the solvent flowing slowly through the tube. One litre of effluent was collected in the first hour and a half, a second in the next hour and a half, and 500 ml. in the following three hours. Surplus solvent was drained from the tube, and the marc was removed and dried in an oven at 55° C.

The initial grist, re-ground to pass a 1 mm. screen and analysed by the method of the Association of Official Agricultural Chemists, 8th edition, showed a pyrethrins content of 1.13% by weight. The solutions from the column were analyzed by diluting a portion with brine, extracting repeatedly with petroleum ether, then analysing the extract by means of the ultra-violet spectrophotometer. The marc was analyzed by re-grinding to pass a 1 mm. screen, extracting for 18 hours with hot petroleum ether, and measuring the pyrethrins extracted by the spectrophotometric method. The pyrethrins from the original 100 g. of grist are shown in the following table:

|  | G. |
|---|---|
| Extracted in 1½ hours | 0.882 |
| Extracted from 1½ to 3 hours | 0.068 |
| Extracted from 3 to 6 hours | 0.085 |
| Marc | 0.086 |
| Total accounted for | 1.121 |

EXAMPLE 2

*Extraction of dried flowers with aqueous methanol*

Three experiments were conducted as in Example 1, using methanol containing 30%, 40% and 50% of water by weight respectively as extracting solvent. In this example, the petroleum ether extracts of the effluents from the column were analysed by the method of the Association of Official Agricultural Chemists, 8th edition.

|  | 70% methanol | 60% methanol | 50% methanol |
|---|---|---|---|
| First extract (1 litre) | 1.118 | 1.089 | 0.840 |
| Second extract (1 litre) | 0.073 | 0.076 | 0.221 |
| Third extract (500 ml.) | 0.027 | 0.029 | 0.069 |
| Marc | 0.086 | 0.116 | 0.208 |
| Pyrethrins accounted for | 1.304 | 1.310 | 1.338 |

In the case of the 50% solvent, the rate of flow was slower, the first litre taking 1 hour 50 minutes and the second, 2 hours.

EXAMPLE 3

Liquid/liquid extraction

Coarsely ground dried flowers were extracted with methanol containing less than 1% of water, yielding about 16 litres of solution containing 45.6 g. of pyrethrins. This was concentrated to 4.4 litres by vacuum distillation. 911 ml. of water was added, giving a concentration of water of about 20% by weight and the solution was filtered through a bed of kieselguhr to remove a small precipitate of tarry matter. A counter-current partition was performed by dividing the solution into five approximately equal portions, which were extracted by shaking with six one-litre portions of isohexane successively in countercurrent.

The isohexane extracts were combined and filtered through a plug of cotton, then the bulk of the solvent was removed by distillation. The strong solution of pyrethrins was cooled to 0° C., filtered through a bed of kieselguhr to remove a small amount of insoluble material, then the remainder of the solvent was removed by vacuum distillation; the residue weighed 51.5 g. and contained 39.0 g. of pyrethrins on analysis by the method of the Association of Official Agricultural Chemists, 8th edition. The extract was clear and orange in colour, and it contained very little wax.

EXAMPLE 4

Extraction direct into kerosene from methanol

A solution of 6.03 g./litre of pyrethrins in aqueous methanol was obtained by extracting ground dried flowers with methanol containing 30% by weight of water. 250 ml. of this solution was mixed with sufficient water to increase the total concentration of water to 40% by weight, then it was shaken with 20 ml. of odourless kerosene. The phases were separated by centrifuging, and the kerosene layer was shaken with a second 250 ml. portion of the methanol solution of pyrethrins, similarly diluted with water. The process was repeated until the same portion of kerosene had been used to extract five 250 ml. portions of the methanol pyrethrins solution. The kerosene was then analysed spectrophotometrically, and found to contain 13.4% pyrethrins by weight.

EXAMPLE 5

Extraction of fresh flowers with anhydrous methanol 1 kg. of fresh pyrethrum flowers were ground in a disintegrator to the point at which the receptacles were broken up and the achenes were separated. 986 g. of ground material were put in a small extracting vessel and covered with one litre of anhydrous methanol. After ten minutes, the liquid was run off and its gravity measured. The flowers were again flooded with 500 ml. anhydrous methanol, and the process was repeated until, after three washings, the gravity of the solution from the flowers had fallen to 0.85. From this point, washing was continued with 80% methanol. The final extract was allowed to stand on the flowers overnight. A total of 3 litres of solution was collected from the flowers.

The extracts were bulked together into three fractions of one litre each. The first fraction was extracted with one litre of isohexane. This isohexane was then used to extract the second and then the third fraction. This extraction procedure was repeated a total of five times, using one litre of isohexane each time.

The five extracts were combined, and the solvent was removed on a water-bath under vacuum. The solvent-free residue weighed 9.13 g. and was found to contain 42.04% pyrethrins when analysed by the AOAC method. The pyrethrins recovered was therefore 3.84 g. 250 g. of the same fresh flowers were dried in vacuo at 50° C. The dried flowers weighed 69.85 g. and contained 1.515 percent pyrethrins. From this, the weight of pyrethrins in the starting material for the extraction experiment was calculated to be 4.18 g. The recovery in the extract from fresh flowers was therefore 92%.

I claim:

1. A process for the production of pyrethrum extract from flowers selected from the group consisting of dried and undried pyrethrum flowers which process comprises extracting the flowers with aqueous methanol containing between 5% and 40% by weight of water followed by liquid/liquid partition with a hydrocarbon solvent.

2. A process as claimed in claim 1 wherein aqueous methanol containing between 20% and 40% by weight of water is employed as the solvent.

3. A process as claimed in claim 1 wherein the hydrocarbon solvent is isohexane.

4. A process as claimed in claim 1 wherein the hydrocarbon solvent is odorless kerosene.

5. A process for the production of a substantially decolourised and wax-free extract containing pyrethrins said process comprising grinding flowers, selected from the group consisting of dried and undried pyrethrum flowers, extracting said flowers with a solvent consisting of methanol containing between 5% and 40% by weight of water, then transferring the pyrethrins from the solution so obtained into a hydrocarbon solvent by a process of liquid/liquid extraction and recovering the extract containing the pyrethrins by distilling off the hydrocarbon solvent.

References Cited by the Examiner

UNITED STATES PATENTS

| | | | |
|---|---|---|---|
| 1,773,102 | 8/1930 | Gnadinger | 167—24 |
| 1,945,235 | 1/1934 | Sankowsky et al. | 260—468 |
| 2,867,649 | 1/1959 | Haney | 260—468 |
| 3,042,706 | 7/1962 | Haus et al. | 260—468 |

LORRAINE A. WEINBERGER, *Primary Examiner.*

IRVING MARCUS, *Examiner.*

A. D. ROLLINS, *Assistant Examiner.*